United States Patent

Dall'Asta et al.

[11] 3,821,183
[45] June 28, 1974

[54] SOLUBLE POLYMERS HAVING ESSENTIALLY THE STRUCTURE OF POLYALKENAMER CHLORO-NITROESTERS AND METHODS OF PREPARING SAME

[75] Inventors: Gino Dall'Asta; Pietro Meneghini; Ugo Gennaro, all of Milan, Italy

[73] Assignee: Montecatini Edison S. p. A., Milan, Italy

[22] Filed: Oct. 25, 1972

[21] Appl. No.: 300,861

[30] Foreign Application Priority Data
Oct. 26, 1971  Italy .................................. 30314/71

[52] U.S. Cl. ........... 260/93.1, 260/32.4, 260/32.8 N, 260/33.6 UA, 260/33.8 UA, 260/80.78, 260/82.1, 260/85.1, 260/88.2 F, 260/94.7 N, 117/132 B
[51] Int. Cl. ........................ C08f 27/02, C08f 27/08
[58] Field of Search ......... 260/93.1, 94.7 N, 88.2 S, 260/85.1, 82.1

[56] References Cited
UNITED STATES PATENTS
3,723,404   3/1973   Davis et al.................... 260/94.9 GB

*Primary Examiner*—Stanford M. Levin

[57] ABSTRACT

New soluble substituted polyakenamers are disclosed, the macromolecules of which consist, predominantly or essentially, of one or more repeating units which are the same or different and which have formula I:

I 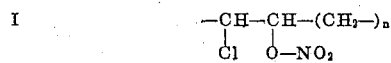

in which $n$ is a whole number from 2 to 10, and/or formula II:

II 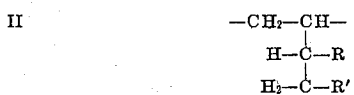

in which R and R' are Cl or —O—NO$_2$, R and R' being different.

A method for preparing the new polyalkenamer chloro-nitroesters is also disclosed and comprises reacting a polymer the macromolecules of which consist essentially of one or more repeating units —CH=CH — (CH$_2$—)$_n$ and/or

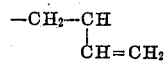

in solution in an organic solvent, with tert. butyl hypochlorite and with aqueous nitric acid in a concentration not higher than 85%.

12 Claims, No Drawings

SOLUBLE POLYMERS HAVING ESSENTIALLY THE STRUCTURE OF POLYALKENAMER CHLORO-NITROESTERS AND METHODS OF PREPARING SAME

Soluble polymers consisting essentially of units containing a chlorine group and an organic ester group bound to two adjacent carbon atoms were described in our U.S. application Ser. No. 189,341, filed Oct. 14, 1971, U.S. Pat. No. 3,772,260, and in our Italian Pat. No. 918,366.

Said United States application and Italian patent disclosed polymers containing ester groups derived from monobasic organic acids containing from 1 to 18 carbon atoms, which organic ester groups impart special properties to the polymers as, for instance, solubility in certain solvents, glass transition temperatures within a given temperature range, or particular mechanical properties.

To the best of our knowledge no polyalkenamers the macromolecules of which contain nitroester group in predominantly or essentially all of the repeating units were known in the art prior to our present invention.

The solubility of our polyalkenamer chloro-nitroesters in commonly available solvents is surprising and unexpected when it is considered that related polymers the ester groups of which consist of residues of sulfuric or phosphoric acid are not linear and soluble but, on the contrary, are cross-linked and insoluble. Our new polymers are stable and this is also surprising and unexpected considering that the nitric acid used in preparing them usually exerts an oxidizing and destructive action on polymers used as starting material either during treatment of the polymer with the acid, or subsequently.

The presence of the nitroester groups in our substituted polyalkenamers imparts properties to the products which clearly distinguish them from prior substituted polyalkenamers as referred to hereinabove. The distinguishing characteristics include excellent resistance to chemical agents, both acid and basic; good adhesion to metal surfaces; very good transparency, and a high degree of solubility in several common solvents. By virtue of such properties the present products are useful as film-builders in paints and in particular in acid-resisting paints.

The products of this invention, and in particular those having a very high molecular weight corresponding to an intrinsic viscosity in toluene at 30°C of not lower than 1.5 dl/g, have, also, high values for their mechanical properties, particularly their tensile yield strength. Furthermore, these products are easily hot-molded in a press or by calendering to transparent, non-brittle films or plates having excellent mechanical resistance. Additional characteristics of products within the scope of this invention are easy inflammability and quick combustion which favor use thereof as slow-combustion explosives or as fuses.

The products of this invention may have varying molecular weights corresponding to intrinsic viscosities in toluene at 30°C of from about 0.5 dl/g to 1.5 dl/g and higher. Those of lower molecular weight corresponding to an intrinsic viscosity in toluene at 30°C of about 0.1 to 0.5 dl/g are generally oily, waxy or semi-solid materials, which can be easily used to fill molds or hollows and are, therefore, plastic explosives.

While the invention provides chloro-nitropolyalkamers the macromolecules of which consist predominantly or essentially of units having formula I and/or formula II, and wherein $n$ in formula I is a whole number, the presently preferred chloro-nitropolyalkamers are those in which in the units of formula I $n$ is a whole number from 2 to 10. The chloro-nitropolyalkamers which are presently preferred are those in which, in the units of formula I present therein, $n$ equals 2, 3, 6 or 10. In such a given chloro-nitropolyalkamer of the invention, $n$ may be 2, 3, 6 or 10 in all units having formula I, or the units of formula I may have varying lengths along the macromolecular main chain, in which case $n$ will vary and can be 2 in some units of formula I, and have a different value of 3, 6 and/or 10 in other units of formula I. That is to say, in all units of formula I present in the linear macromolecular main chain n may equal a given whole number such as 2, 3, 6 or 10, or in one or more units of formula I $n$ may equal 2, for instance, and have a different value, e.g., 3, 6 or 10 in other units of formula I.

Solvents which are particularly suitable for preparing highly concentrated solutions of the polymers of this invention include methylene chloride, nitrobenzene, acrylonitrile, acetonitrile, nitromethane, methyl n-hexylketone, tetrahydrofuran, acetone, dioxane, dimethylformamide and cyclohexanone.

The polymers of this invention the macromolecules of which consist predominantly of units having formula I and/or formula II may also contain minor amounts of units corresponding to other formulae, which may be due either to incompleteness of the reaction by which the units of formual I or of formula II are formed, or to secondary reactions. In general, the extraneous units which may be present in the polymers are those having the formulae III, IV, V, VI and VII as shown below:

III:  $-CH=CH-(CH_2-)_n$

IV: 
$$-CH_2-CH- \atop |\phantom{xx}CH=CH_2$$

V:  $-CHCl-CHCl-(CH_2-)_n$

VI: 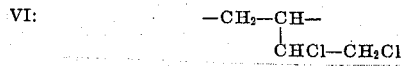
$$-CH_2-CH- \atop |\phantom{xx}CHCl-CH_2Cl$$

VII: 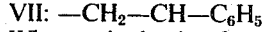 $-CH_2-CH-C_6H_5$

When units having formulae III and/or IV are present, the olefinic unsaturations thereof can be utilized to vulcanize the polymers or to introduce other groups such as, for example, those described in our U.S. application Ser. No. 189,341 and in our Italian patent No. 918,366 referred to hereinabove.

Various properties of two typical high molecular weight polymers according to this invention are shown in the following table:

| Properties | Measurement unit | Structure of the polymer's predominant units | |
|---|---|---|---|
| | | -CH-CH-(CH$_2$-)$_2$<br>\|  \|<br>Cl  ONO$_2$ | -CH-CH-(CH$_2$-)$_3$<br>\|  \|<br>Cl  ONO$_2$ |
| Chlorine content | Percent by weight | 25.5 | 22.8 |
| Iodine number | | >0.5 | >0.5 |
| Intrinsic viscosity in cyclohexanone at 30° C | Dl.g | 2.5 | 1.7 |
| Glass transition temperature | °C | 56 | 31 |
| Density at 30° C | G./cm.$^3$ | 1.44 | 1.38 |
| Water absorption (standard ASTM D 570 63) | Percent | <0.1 | <0.1 |
| Transparency (standard ASTM D 1003/61) | Percent | 91.5 | 92.5 |
| Diffusion (standard ASTM D 1003/61) | Percent | 1.3 | 0.8 |
| Transparency at 4,500 A | Percent | 92 | 90.5 |
| Flexural modulus on lamina | Kg./cm.$^2$ | 41,000 | |
| Tensile yield strength | Kg./cm.$^2$ | 630 | |
| Combustion rate | In./sec | 0.25 | 0.30 |
| Limit of thermal stability in air flow (weight loss: 10%) | °C | 160 | 155 |

It was not only surprising that the stable, soluble polymers of this invention can exist. It was also surprising and unexpected that they could be obtained by treating polymers made up essentially of one or more repeating units of formula II, IV or VII as shown above, in solution in an organic solvent, with nitric acid and tert. butyl hypochlorite, without oxidizing and destructive effects on the starting polymer by the nitric acid.

Contrary to what could have been expected, we have found that these new chloro-nitropolyalkamers can be obtained by reacting the starting polymer in an organic solvent, preferably methylene chloride, and under intense stirring, with nitric acid and tert. butyl hypochlorite provided that aqueous nitric acid is used and the nitric acid concentration is not higher than 85%.

It is necessary to employ aqueous nitric acid at a concentration of the acid not higher than 85%. If nitric acid is used in higher concentration, for instance anhydrous nitric acid, for preventing the formation of an emulsion during mixing of the organic solvent in which the starting polymer is dissolved, such as the preferred methylene chloride, undesired side reactions occur such as, for instance, oxidation of the polymeric chain of the starting polymer and its consequent degradation to tarry products of indefinite nature.

By operating with aqueous nitric acid in which the acid concentration is not higher than 85%, for instance at a nitric acid concentration of 65% by weight, the desired reaction, i.e., the formation of the polyalkamer-chloronitroesters takes place practically exclusively. Such result is surprising and particularly so when it is considered that the formation of the esters does not take place in a purely organic phase but in an emulsion of methylene chloride and the water of the aqueous nitric acid used and that, in consequence, both the starting polymer and the tert. butyl hypochloride are contained in the organic phase while the nitric acid is essentially present in the aqueous phase.

In spite of the existence of the two different phases, we have found that the reaction can be conducted until practically all of the double bonds of the starting polymer are saturated by operating at temperatures of from −50°C to +50°C, preferably from −30°C to +35°C, for reaction times varying, according to the temperature, from 2 to 24 hours, preferably from 2 to 10 hours, with an amount of tert. butyl hypochlorite comprised between 1.0 and 1.5 moles, preferably between 1.0 and 1.3 moles per mole of starting homopolymer double bonds, and with an amount of nitric acid between 1.0 and 1.5 moles, preferably between 1.0 and 1.25 moles, per mole of starting homopolymer double bonds.

Use of a particular catalyst is not required in our process for producing the chloro-nitropolyalkamers of the invention.

In general, a solution of the starting polymer in methylene chloride or other solvent containing the polymer in a concentration of from 0.2% to 20% by weight, preferably of from 0.1% to 10% by weight are used. Higher concentrations may be used if the starting polymer is oily and has a comparatively low molecular weight corresponding to an intrinsic viscosity in toluene at 30°C of from about 0.1 to 0.5 dl/g.

Since the chloro-nitroesterification reaction is highly exothermic, it is necessary to subject the reaction mixture to intense cooling, especially when a high concentration of the starting polymer is used.

The reaction mixture is stirred vigorously, or circulated rapidly, to accelerate and control the chloro-nitroesterification reaction.

A schematic showing of the continuous reaction process is shown below:

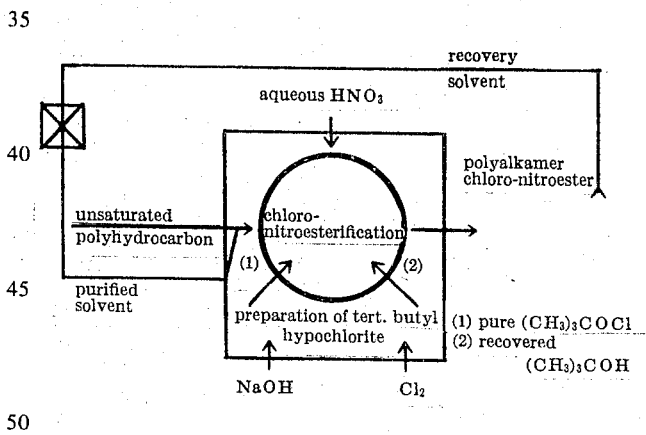

As is apparent from the schematic showing, butyl alcohol is essentially regenerated from the reacted tert. butyl hypochlorite and recycled for use in preparing additional tert. butyl hypochlorite for use in the reaction.

The solvent is also essentially recycled, the materials consumed being the starting homopolymer, nitric acid, caustic soda and chlorine. The products of the reaction are the chloro-nitroesterified starting homopolymer and sodium chloride.

The starting polymers used are those the monomeric units of which correspond to formulae III, and/or IV, or VII as shown above. Of the polymers the units of which correspond to formula III, the preferred ones are those in which n is 2, 3, 6 or 10 and is the same or different for the units of formula III occurring along the macromolecular main chain of the starting polymer. Examples of such polymers are polybutadiene in which the units derived from butadiene have prevailingly 1,4-cis or 1,4-trans structure, or in which some of the units derived from the monomer have 1,4 cis structure and others show 1,4 trans enchainment; the polypentenamer, the polyoctenamer and the polydodecenamer having double bonds which are prevailingly cis, prevailingly trans, or a mixture of the two types; and butadiene-styrene copolymers. Said starting polymers may be of either high or low molecular weight.

While it is possible to saturate all of the double bonds of the starting polymer, it is also within the purview of this invention to use the nitric acid and tert. butyl hypochlorite in amounts insufficient to saturate all of the double bonds of the starting polymer and thus obtain end products containing a certain amount of double bonds in addition to units of formula I or II.

The polyalkamer chloro-nitroesters prepared under the conditions specified herein always have an intrinsic viscosity such as to prove that the starting polymer has not undergone any molecular weight degradation or only very limited molecular weight degradation, during the chloro-nitroesterification.

The polyalkamer chloro-nitroesters are generally separated from the reaction mixture, after the chloro-nitroesterification by coagulation with precipitants such as methanol and appear white or yellowish powders.

The following examples are given to illustrate the present industrial invention, and are not intended to be limiting.

EXAMPLE 1

30 g of commerical 1,4 cis-polybutadiene containing 92.4% of double cis-bonds, 4% of double trans-bonds, 3.6% of butadiene units, and having an intrinsic viscosity in cyclohexanone at 30°C of 2.20 dl/g, are dissolved in 3 l of methylene chloride. 50 ml of 65% nitric acid are admixed thereto under stirring and at room temperature. By means of a dropping-funnel 75 ml of tert. butyl hypochlorite are added over 15 minutes.

During the reaction the temperature rises to 35°C.

The whole is reacted for 4 hours under stirring and the reaction product is coagulated in methanol.

76 g of a pulverulent white polymer are obtained, having characteristics as follows:

| | |
|---|---|
| intrinsic viscosity in cyclohexanone at 30°C | 2.50 dl/g |
| glass transition temperature | 56°C |
| density at 30°C | 1.44 g/cm$^3$ |
| iodine number | <0.1 |

The polymer is soluble in chlorinated solvents and in polar solvents such as acetone or acetonitrile. There are no unsaturations. The chlorine content = 25.5%.

EXAMPLE 2

2.5 g of polybutadiene as described in Example 1 are dissolved in 250 ml of methylene chloride. At room temperature and under stirring, 35 ml of 80% nitric acid and, by means of a dropping-funnel, 10 ml of tert. butyl hypochlorite are admixed. The whole is allowed to react for 4 hours, and is then coagulated in methanol.

6.0 g of polymer in the form of a white powder are thus obtained. It is soluble in chlorinated solvents (for instance methylene chloride) and polar solvents (for example acetone) and exhibits the following characteristics:

| | |
|---|---|
| chlorine content | 25.3% |
| iodine number | <0.5 |
| intrinsic viscosity | 2.13 dl/g measured in cyclohexanone at 30°C. |

EXAMPLE 3

20 g of trans-polypentenamer (containing 20% of double cis-bonds and 80% of double trans-bonds and having a viscosity in toluene at 30°C of 1.89 dl/g) are dissolved in 2 liters of methylene chloride. At room temperature and under stirring, 30 ml of 65% nitric acid and, by means of a droping-funnel, 45 ml of tert. butyl hypochlorite are admixed over 15 minutes. The whole is allowed to react for 4 hours under stirring: it is then coagulated in methanol.

43 g of pulverulent white polymer having the following characteristics are thus obtained:

| | |
|---|---|
| glass transition temperature | 31°C |
| density | 1.38 at 30°C |
| intrinsic viscosity | 1.68 dl/g in cyclohexanone at 30°C |
| unsaturations | none |
| chlorine content | 22.7% |

EXAMPLE 4

30 g of polydodecenamer containing 85% of double trans-bonds and 15% of double cis-bonds, and having an intrinsic viscosity in cylohexanone at 30°C of 1.8 dl/g, are dissolved in 2 liters of methylene chloride. Under stirring and at room temperature, 20 ml of 65% nitric acid are added. Subsequently, 25 ml of tert. butyl hypochlorite are dripped from a dropping-funnel in 10 minutes. During the reaction the temperature rises to 35°C. After 6 hours and under intense stirring the polymer is isolated by coagulation in methanol. 44 g of a pulverulent white polymer having the following characteristics are thus obtained:

| | |
|---|---|
| intrinsic viscosity in cyclohexanone at 30°C | 1.95 dl/g |
| glass transition temperature | +2°C |

The polymer is soluble in solvents such as methylene chloride and acetonitrile.

EXAMPLE 5

Four 0.5 mm thick laminas made of common steel are half-coated on both sides with a 50 micron thick film of the polybutamer chloro-nitroester described in Example 1. Such film is applied by repeatedly dipping a half of the laminas into a 10% solution of the polymer in acetone and by subsequent evaporation of the solvent. After drying of the films, the four laminas so treated are thoroughly dipped into the following chemical reagents:

1. aqueous caustic soda at 5%
2. aqueous hydrochloric acid at 5%
3. aqueous nitric acid at 5%
4. aqueous acetic acid at 5%

After a dipping period of 48 hours, the laminas are washed with water. All four laminas exhibit deep corrosions in the non-coated parts, while the parts coated with the polymer film are still perfectly specular. The films are removed from the laminas after the treatment. All of them are still thoroughly soluble in the above-mentioned solvents such as the solvents of the polymers of this invention.

As will be apparent, changes and variations in details can be made in practicing this invention, without departing from its spirit. Therefore, we intend to include in the scope of the appended claims all such modifications as will be obvious to those skilled in the art from the description and working examples given herein.

We claim:

1. Solid substituted polyalkenamers the macromolecules of which consist essentially of one or more repeating units having the following formula:

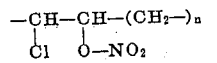

wherein $n$ is a whole number from 2 to 10, and/or the following formula:

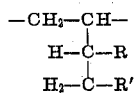

wherein R and R' are Cl or $-O-NO_2$, R being always different from R' and, optionally, up to 10% of units represented by a formula selected from the following formulae wherein $n$ is a whole number from 2 to 10;

$$-CH=CH-(CH_2-)_n$$

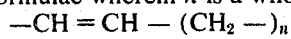

$-CHCl-CHCl-(CH_2-)_n$; and

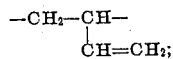

optionally, up to 25% of units derived from monomeric styrene.

2. Polyalkenamers according to claim 1, characterized in that the macromolecules thereof consist essentially of repeating units having formula

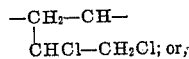

wherein $n$ is a whole number from 2 to 10.

3. Polyalkenamers according to claim 1, characterized in that the macromolecules thereof consist essentially of repeating units having formula

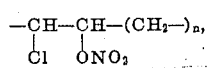

wherein $n = 2$.

4. Polyalkenamers according to claim 1, characterized in that the macromolecules thereof consist essentially of repeating units having formula

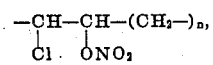

wherein $n = 3$.

5. Polyalkenamers according to claim 1, characterized in that the macromolecules thereof consist essentially of repeating units having formula

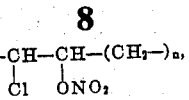

wherein $n = 6$.

6. Polyalkenamers according to claim 1, characterized in that the macromolecules thereof consist essentially of repeating units having formula

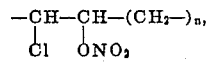

wherein $n = 10$.

7. Process for preparing high molecular weight, substituted polyalkenamers consisting essentially of one or more repeating units having the formula

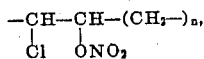

wherein $n$ is a whole number from 2 to 10, and/or formula

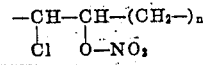

wherein R and R' are Cl or $-O-NO_2$, R being always different from R', characterized in that a homopolymer the macromolecules of which consist essentially of one or more repeating units wherein $n$ is a whole number from 2 to 10

$$-CH=CH-(CH_2-)_n \text{ and/or}$$

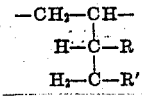

is reacted, at a temperature comprised between $-50°C$ and $+50°C$, in an organic solvent solution, with tert.butyl hypochlorite in an amount comprised between 1.0 and 1.5 moles, per mole of double bonds in the starting polymer, and with aqueous nitric acid at a nitric acid concentration not higher than 85%.

8. Process according to claim 7, characterized in that the reaction is carried out at temperatures comprised between $-30°C$ and $+35°C$.

9. Process according to claim 7, characterized in that the reaction is carried out with an amount of tert. butyl hypochlorite in an amount comprised between 1.0 and 1.3 moles, per mole of double bonds in the starting polymer.

10. Process according to any of claim 7, characterized in that it is operated with nitric acid amounts ranging from 1 to 1.5 moles, per mole of double bonds of the starting polymer.

11. Process according to any of claim 7, characterized in that it is operated with nitric acid amounts ranging from 1 to 1.25 moles, per mole of double bonds of the starting polymer.

12. Substituted polyalkenamers according to claim 1, in the form of film-building products for paints having excellent adhesiveness and resistance to chemical agents.

* * * * *